(12) United States Patent
Hering et al.

(10) Patent No.: US 12,238,386 B2
(45) Date of Patent: Feb. 25, 2025

(54) IDENTIFICATION OF SESSION BOUNDARIES IN ENCRYPTED VIDEO STREAMS

(71) Applicant: Telefonaktiebolaget LM Ericsson (publ), Stockholm (SE)

(72) Inventors: András Hering, Vanyarc (HU); Zoltán Móczár, Budapest (HU); Atilla Dudás, Szeged (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/032,621

(22) PCT Filed: Nov. 30, 2020

(86) PCT No.: PCT/IB2020/061292
§ 371 (c)(1),
(2) Date: Apr. 19, 2023

(87) PCT Pub. No.: WO2022/112835
PCT Pub. Date: Jun. 2, 2022

(65) Prior Publication Data
US 2023/0412893 A1    Dec. 21, 2023

(51) Int. Cl.
*H04N 21/647* (2011.01)
*H04L 43/026* (2022.01)

(52) U.S. Cl.
CPC ..... *H04N 21/64723* (2013.01); *H04L 43/026* (2013.01)

(58) Field of Classification Search
CPC .................. H04N 21/64723; H04L 43/026
See application file for complete search history.

(56) References Cited

U.S. PATENT DOCUMENTS 10,986,001 B2 *  4/2021 Guo .................. H04L 65/80
2019/0075477 A1 *  3/2019 Dion .................. H04W 24/08
(Continued)

FOREIGN PATENT DOCUMENTS

CN      110855669 A    2/2020
EP      3518494 A1     7/2019

OTHER PUBLICATIONS

Bronzino et al. "Inferring Streaming Video Quality from Encrypted Traffic: Practical Models and Deployment Experience", https://dl.acm.org/doi/pdf/10.1145/3366704, Dec. 17, 2019 (Year: 2019).*

(Continued)

*Primary Examiner* — James E Springer
*Assistant Examiner* — Patrick F Ngankam
(74) *Attorney, Agent, or Firm* — COATS & BENNETT, PLLC

(57) ABSTRACT

A comprehensive approach for segmenting encrypted streams of media content into individual sessions is provided herein. Particularly, a network node identifies a connection to a known content delivery related domain and receives the data packets comprising the encrypted streams over the connection. The data packets comprise a pattern of one or more features indicating a media content start event for the media content being provided to a subscriber via the connection. The subsequent network activity is then monitored in a pre-determined time frame and an associated pattern analyzed. A media content start event may then be detected based on the analysis of the pattern.

18 Claims, 5 Drawing Sheets

(56) References Cited

U.S. PATENT DOCUMENTS

2019/0230010 A1* 7/2019 Guo .................... H04L 43/0894
2020/0186615 A1* 6/2020 Halepovic ........... H04L 65/1063

OTHER PUBLICATIONS

McManus "Does the QUIC handshake require compression to be fast?", https://blog.apnic.net/2020/05/28/does-the-quic-handshake-require-compression-to-be-fast/, May 28, 2020 (Year: 2020).*

Bronzino et al. "Inferring Streaming Video Quality from Encrypted Traffic: Practical Models and Deployment Experience", https://dl.acm.org/doi/abs/10.1145/3366704 (Year: 2019).*

McManus "Does the QUIC handshake require compression to be fast?", https://www.fastly.com/blog/quic-handshake-tls-compression-certificates-extension-study (Year: 2020).*

Bronzino et al. "Inferring Streaming Video Quality from Encrypted Traffic: Practical Models and Deployment Experience", https://dl.acm.org/doi/pdf/10.1145/3366704 (Year: 2019).*

Bronzino, F. et al., "Inferring Streaming Video Quality from Encrypted Traffic: Practical Models and Deployment Experience", Proceedings of the ACM on Measurement and Analysis of Computing Systems, vol. 3, No. 3, Article 56, Dec. 2019, pp. 1-25, ACM.

Mazhar, M. et al., "Real-time Video Quality of Experience Monitoring for HTTPS and QUIC", IEEE INFOCOM 2018—IEEE Conference on Computer Communications, Apr. 16-19, 2018, pp. 1331-1339, IEEE.

Mangla, T. et al., "Using Session Modeling to Estimate HTTP-Based Video QoE Metrics From Encrypted Network Traffic", IEEE Transactions on network and service management, vol. 16 No. 3, Sep. 2019, pp. 1086-1099, IEEE.

Dimopoulos, G. et al., "Measuring Video QoE from Encrypted Traffic", IMC' 16: Proceedings of the 2016 Internet Measurement Conference, Nov. 14, 2016, pp. 513-526, ACM.

Johnsson, P. et al., "Ericsson Mobility Report", ericsson.com/mobility-report, Jun. 2020, pp. 1-36, retrieved in Jun. 2020, retrieved from internet: https://www.ericsson.com/en/reports-and-papers/mobility-report/reports.

* cited by examiner

IDENTIFICATION OF SESSION BOUNDARIES IN ENCRYPTED VIDEO STREAMS

TECHNICAL FIELD

The present disclosure relates generally to the processing of media streams, and more particularly to techniques for identifying boundaries in encrypted media streams for measuring the Quality of Experience (QoE).

BACKGROUND

According to current predictions, the year 2025 will see 2.8 billion mobile subscribers, out of a total 8.9 billion subscribers, who will have access to 5G networks. As a result of the widespread availability of high-speed mobile technologies, mobile data traffic is expected to grow by 31% annually between 2019 and 2025. The expectation is that 76% of all mobile traffic in terms of data volume will be some form of media content, such as video. Recognizing this increasing trend, Mobile Network Operators (MNOs) who are interested in understanding the quality of the service (QOS) they provide their subscribers will seek network analytics packages that are specialized for this type of traffic. Such an understanding, however, requires measuring both the performance of the mobile network managed by the operator and the quality of experience (QoE) perceived by the subscribers. To quantify the service quality, operators generally use passive probes for monitoring and analyzing the traffic of the core network.

Historically, the emerging trend of prioritizing security and privacy aspects has led to a significant decrease in data visibility. This is at least partially due to the fact that almost all video traffic is encrypted and transmitted using Transmission Control Protocol (TCP)+Transport Layer Security (TLS) or Quick User Datagram Protocol Internet Connections (QUIC) protocols. More particularly, the end-to-end encryption between endpoints effectively eliminates the use of using Deep Packet Inspection (DPI) techniques, which are traditionally employed for retrieving different fields of HyperText Transfer Protocol (HTTP) requests, to analyze and determine the most important parameters of a video stream (e.g. representation details of the video), or to track the requested segments.

There are currently several types of Key Performance Indicators (KPIs) used to quantify the QoE of video sessions. Such KPIs include, for example, the initial buffering time, the video bitrate, the video rebuffering ratio, and the mean opinion score (MOS), which is a standardized subjective quality measure. Various studies focusing on QoE estimation for encrypted video traffic apply a buffer state model to correctly predict the phases of a video watching session. For example, "System and Method for Quality of Service Detection of Encrypted Packet Flows", US 2019/0230010, July 2019 describes one such technique.

Currently, the vast majority of content providers offer adaptive video streaming services, which have many common characteristics. For example, to maintain smooth playback experience, video sessions typically start with an initial buffering phase in which a client application downloads video data at a higher rate. This initial buffering phase can last from a couple of seconds to a plurality of minutes. During this phase, the client application fills a video buffer. The content in this buffer can then be rendered continuously even when network conditions are insufficient throughout the session. After the client application's buffer is filled to a predetermined level, the client application transitions into a "steady-state phase," and only requests video segments to keep buffer occupancy at that level. Finally, the client enters the draining phase when the remaining part of the video session has already been buffered. In this phase, the client no longer downloads any data, but instead, renders the buffered video content.

Correctly identifying the different phases of video playback is crucial for buffer state models because it allows for estimating various QoE measures, as discussed previously. However, buffer phase detection can be quite challenging and inaccurate in cases when user-initiated events cause instant buffer depletion. Such events include, but are not limited to, the start of a new video, forwarding into an unbuffered part of the stream, or changing the resolution during video playback.

SUMMARY

Embodiments of the present disclosure provide a comprehensive approach for segmenting encrypted media streams, such as video streams, for example, into individual sessions with special emphasis on cost-efficient implementation that promotes easy deployment. More particularly, the present embodiments consider network conditions, user interactions, client applications, and the underlying transport protocols in order to detect a media start event, such as a video start event.

Therefore, the present disclosure provides a method for detecting media content start events. In one embodiment, the method comprises receiving data packets from a monitoring device, wherein the data packets comprise a pattern of one or more features indicating a media content start event for media content being provided to a subscriber, and detecting the media content start event based on an analysis of the pattern of one or more features.

The present disclosure also provides a corresponding network node for detecting media content start events. In this embodiment, the network node comprises communications interface circuitry configured to communicate with at least one monitoring device configured to monitor media session traffic in a communications network, and processing circuitry operatively coupled to the communications interface circuitry. In this embodiment, the processing circuitry is configured to receive data packets from the monitoring device, wherein the data packets comprise a pattern of one or more features indicating a media content start event for media content being provided to a subscriber, and detect the media content start event based on an analysis of the pattern of one or more features.

The present disclosure further provides a non-transitory computer-readable medium storing computer program code thereon. In this embodiment, when executed by the processing circuitry of a network node configured to detect media content start events, the computer program code causes the network node to receive data packets from the monitoring device, wherein the data packets comprise a pattern of one or more features indicating a media content start event for media content being provided to a subscriber, and detect the media content start event based on an analysis of the pattern of one or more features.

DETAILED DESCRIPTION

Figure 1:
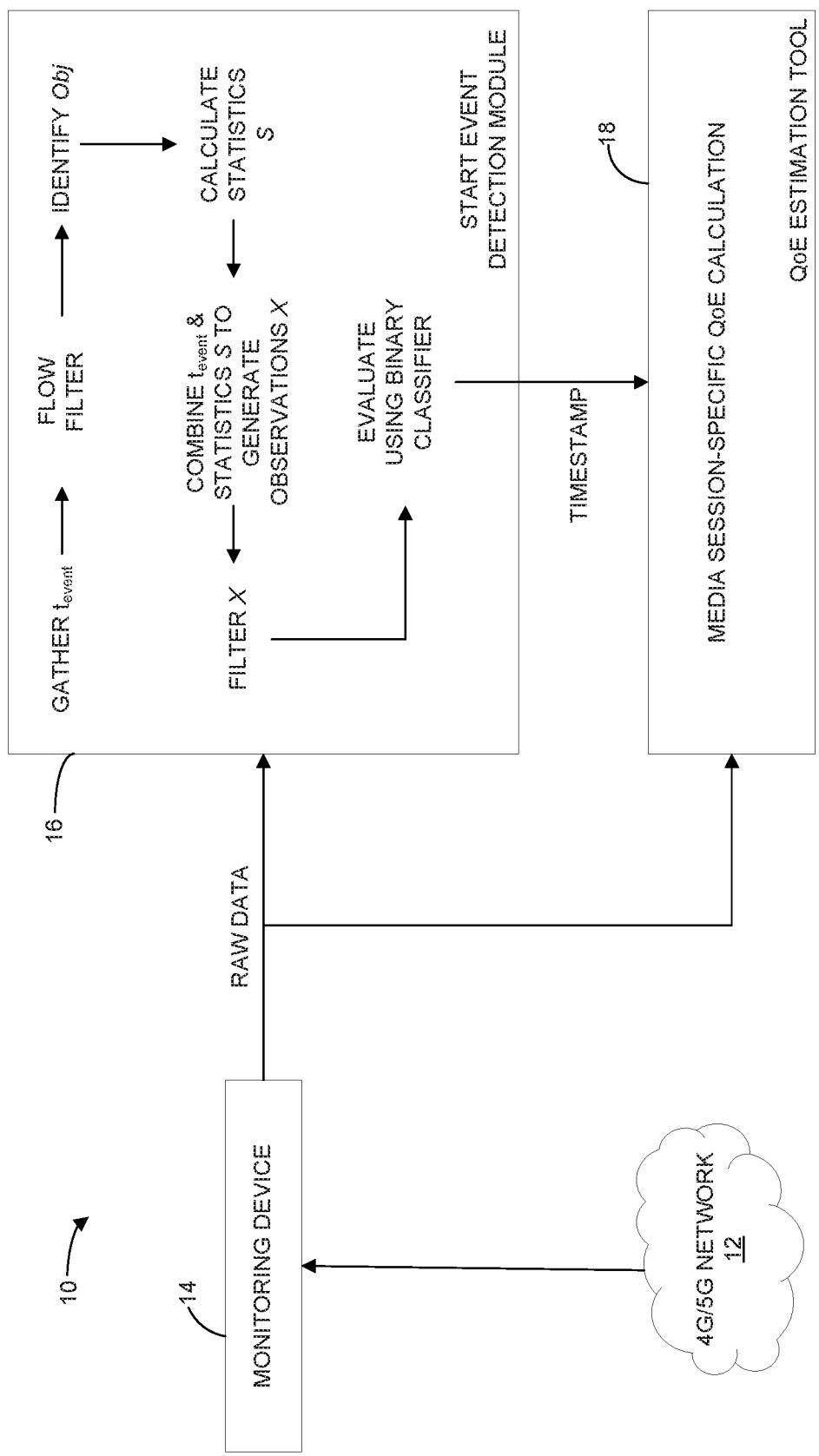
FIG. 1 is a functional block diagram illustrating a system for identifying video start events according to one embodiment of the present disclosure.

As previously stated, correctly identifying the different phases of video playback is crucial for buffer state models because it allows for estimating various QoE measures. Identification of session boundaries in a continuous encrypted video stream is especially important. Not only is it necessary for properly tracking buffer occupancy, but also because most of the QoE prediction models provide quality metrics for the whole video session. Even so, research efforts focusing on session-level QoE estimation often neglect to detect video start events and assume that information about such session boundaries is available in advance. Such assumptions typically hold true for carefully collected experimental data, but they do not hold true in production systems. Segmenting the video stream of the user into multiple sessions each containing a single video is, therefore, an overlooked yet critical problem that needs to be solved by QoE analytics solutions deployed in commercial mobile networks.

Despite its importance, however, few have done any meaningful work on how to identify the start of video sessions. For example, the paper to G. Dimopoulos, I. Leontiadis, P. Barlet-Ros, K. Papagiannaki, entitled "Measuring Video QoE from Encrypted Traffic", Proc. of the ACM IMC'16, pp. 513-526, Santa Monica, CA, USA, November 2016, indicates that HTTP traffic patterns could potentially indicate new videos. Such traffic patterns include, for example, requests to download both video content and some additional objects (scripts, images, etc.) related to loading of a webpage. Silent periods with negligible or no traffic between consecutive sessions are also interpreted as a sign indicative of a session boundary. F. Bronzino, P. Schmitt, S. Ayoubi, G. Martins, R. Teixeira, N. Feamster, who authored "Inferring Streaming Video Quality from Encrypted Traffic: Practical Models and Deployment Experience", Proc. of the ACM on Measurement and Analysis of Computing Systems, vol. 3, no. 3, pp. 1-25, December 2019, follow a similar but more sophisticated approach. Particularly, their approach also takes the number of new video flows into account. Further, they define a set of rules by introducing different thresholds for a variety of conditions.

K. Guo, S. Miller, and L. Wu, the named inventors of "System and Method for Quality of Service Detection of Encrypted Packet Flows", US 2019/0230010 A1, July 2019, describe a method where the start and the end of a video session is detected based on observing HTTP request-response messages transmitted between a mobile client and one of the web servers associated with a content provider.

Such conventional methods are useful, but they can also be problematic. For example, many sophisticated methods have been developed over the years to monitor video QoE. Some of these methods try to identify the different phases of a video stream using input packet traces in order to predict video quality metrics. For example, a client application receiving a video stream normally tries to maintain a receive buffer at a certain level. In these cases, the time between two chunk downloads in a steady-state phase indicates how many seconds worth of data is downloaded in a chunk. Thus, it is possible to estimate a video bitrate by measuring a download rate in these stable phases.

Unfortunately, most of the QoE monitoring tools assume that video session start times are known a priori in order to predict player states, or treat video sessions as separate traffic traces. Meanwhile, the data is actually seen as a continuous flow by network probes containing multiple video sessions. Experience has shown that, in at least some cases, obtaining the needed information for determining session boundaries in a video stream is quite challenging. Such difficulties can lead to the inaccurate identification of the session boundaries, which in turn, can significantly affect the outcome of QoE estimation.

There have been some attempts to provide start event predictions, but the scope of these conventional attempts is limited to supporting QoE metric estimation. Therefore, these conventional attempts are mostly applicable to specific use cases. Moreover, the impact of user behavior is often ignored by these conventional solutions and can result in considerable accuracy loss when dealing with real-world data. For example, before starting a new video, conventional solutions assume that videos are always played from start to end. When this assumption holds, start events typically occur after a "draining phase" (i.e. the network is idle). In reality, however, users can, and often will, abandon videos before they end and start a new session. Thus, conventional solutions that assume video sessions are always demarcated with an "idle period" (i.e., are always played until they end) may perform poorly when early abandonment occurs.

Other conventional methods presume a strong connection between the lifetime of one or more concurrent video flows and the life of a video session. However, these methods also face difficulties. Generally, new connections are established for downloading new videos. Nevertheless, this behavior is not exclusive to start events. To download new videos, some client applications are configured to utilize existing connections, or "already-open" connections that were opened long before actually beginning to download the video content. In these cases, the conventional methods may not be able to detect a start event associated with a video session.

Other client behaviors should also be managed, such as the opening of new flows and the closing of existing flows during the same video session. For example, an extended pause event may cause flows to time out and be closed automatically, while a subsequent continue event will require new flows to be opened. The GQUIC (the Google version of the QUIC protocol), for example, automatically closes flows after 30 seconds of inactivity during YouTube video sessions. This can result in higher number of reported video sessions. In addition, resumed video sessions treated as video start events may estimate a start-up delay to be zero. This, however, can skew the overall estimated start-up delay distribution. Certain user interactions and network conditions can also affect the accuracy of start event detections. For instance, "seek" events or "resolution change" events can trigger a transition to a low buffer phase, which has similar characteristics compared to a start event. Therefore, conventional methods may detect situations that are not actually video start events.

Accordingly, embodiments of the present disclosure consider an approach that calls for monitoring the "whole" of a given subscriber's traffic. Then, based on the monitoring, the present embodiments "indirectly" detect the start of a new video (i.e., a start event) by analyzing activities and identifying various events occurring in any flow not strictly connected to the video data itself.

Utilizing circumstantial data enables the accurate identification of media start events; however, any characteristics specific to a given service provider or platform cannot be generalized. As an example, monitoring web page downloads of video sessions could provide a good "hint" that a video start event has occurred. However, some providers implement advanced algorithms that make switching between sessions relatively seamless. These algorithms, while proving beneficial for an end user, can result in a transition that does not require the download of larger elements. Moreover, data usage can also differ between a mobile native application and web browsers. This discrepancy can cause problems when establishing threshold values. For example, a certain threshold may be suitable for desktop users employing a web browser on a personal computer. Mobile native application users, however, may never meet this threshold. Distinguishing between these types of users from the monitored traffic traces is not always feasible. Therefore certain threshold values can lead to different prediction outcomes for different types of users.

The present disclosure addresses these and other issues. Particularly, embodiments of the present disclosure provide a comprehensive approach for segmenting encrypted media streams, such as video streams, for example, into individual sessions with a special emphasis on cost-efficient implementation that promotes easy deployment. The present embodiments generalize well across different video services and provide input to existing session-based QoE estimation tools. This is achieved by identifying one or more connections to known content delivery related domains, and monitoring the subsequent network activity in a pre-determined time frame.

For the analysis and detection of start events, the present embodiments consider the following assumptions, as well as some common characteristics of service providers.

The present embodiments assume a very high probability of establishing connections to different domains when starting new videos. Therefore, it is highly unlikely that different video streams rendered in a single instance are delivered from the same domain.

Upon starting a video, the present embodiments are able to observe or detect an "initial buffering phase." During this phase, a client will typically request a large amount of data that is delivered in a brief period of time.

Certain network activities not related to video streaming are also correlated with video starts events. Some of these network activities include, but are not limited to, the establishment of one or more connections to one or more domains associated with advertisement and/or QoE reporting, and the download of various elements such as video player code and/or other static contents.

According to the present disclosure, the features on which the assumptions are based are observable in network traces using a passive monitoring device. Further, with the present embodiments, the features are observable in encrypted packets.

To detect video start events, embodiments of the present disclosure capture and analyze various traffic patterns for certain indictors. For example, observing new connections to a plurality of different domains can indicate a video start event. One key indicator is whether the connection is established with a video serving domain.

Further, once connection establishment is completed, signs of a buffering phase appear and can be detected. For example, HTTP GET requests can be observed among the uplink packets shortly after connection initiation. Such requests are typically followed by a large amount of data in the downlink direction. Detecting one or both of these activities can indicate the buffering phase, based on which a video start event can be determined. Additionally, by monitoring multiple factors, the present embodiments enable adaptation to various network conditions and user behaviors where start events are likely. The determinations can then be used as an input for machine learning models, for example, or as input into less complicated models. Therefore, the present embodiments are able to generalize and provide accurate predictions for at least some of the most common use cases experienced in live networks without sacrificing runtime performance.

Accordingly, the proper identification of video start events is an often overlooked, yet key issue, for session-based QoE estimation. The present disclosure therefore provides a comprehensive solution that is universally applicable to a wide range of media content providers. As described in more detail below, the present embodiments consider different aspects when identifying video start events. These aspects include, but are not limited to, network conditions, user interactions, client applications, and the underlying transport protocols. Considering these aspects, as in the present disclosure, allows for a computationally feasible and accurate solution.

Turning now to the drawings, FIG. 1 is a functional block diagram illustrating a system 10 for identifying video start events according to one embodiment of the present disclosure. Those of ordinary skill in the art should readily appreciate that while the present embodiments are described specifically for video streams, this is for illustrative purposes only. The present embodiments may be used to determine start events for other types of media streams, such as audio streams, for example.

As seen in FIG. 1, system 10 comprises a communications network 12 (e.g., 4G/5G network), a monitoring device 14, a start event detection module 16, and a media session specific calculation function executing on a QoE estimation tool 18. Other components (e.g., network devices, functions, and components) may or may not be present as is known in the art.

Mobile Network Operators (MNOs) generally use passive probes to monitor the total traffic of the network through different interfaces and to map traffic flows to a given subscriber. Typical tapping points include, but may not be limited to, an S1-U or S5/S8 interface in a 4G network and an N3 interface in a 5G network. Thus, as shown in FIG. 1, monitoring device 14 monitors the traffic flows in network 12. Packet-level information about those flows is then input into the start event detection module 16 by monitoring device 14. The start event detection module 16 then processes the packets to detect video session boundaries, as described in more detail later, and outputs the timestamps of the detected video session boundaries, such as the timestamp of a video session start event, for example, to the QoE estimation tool 18.

Figure 2:
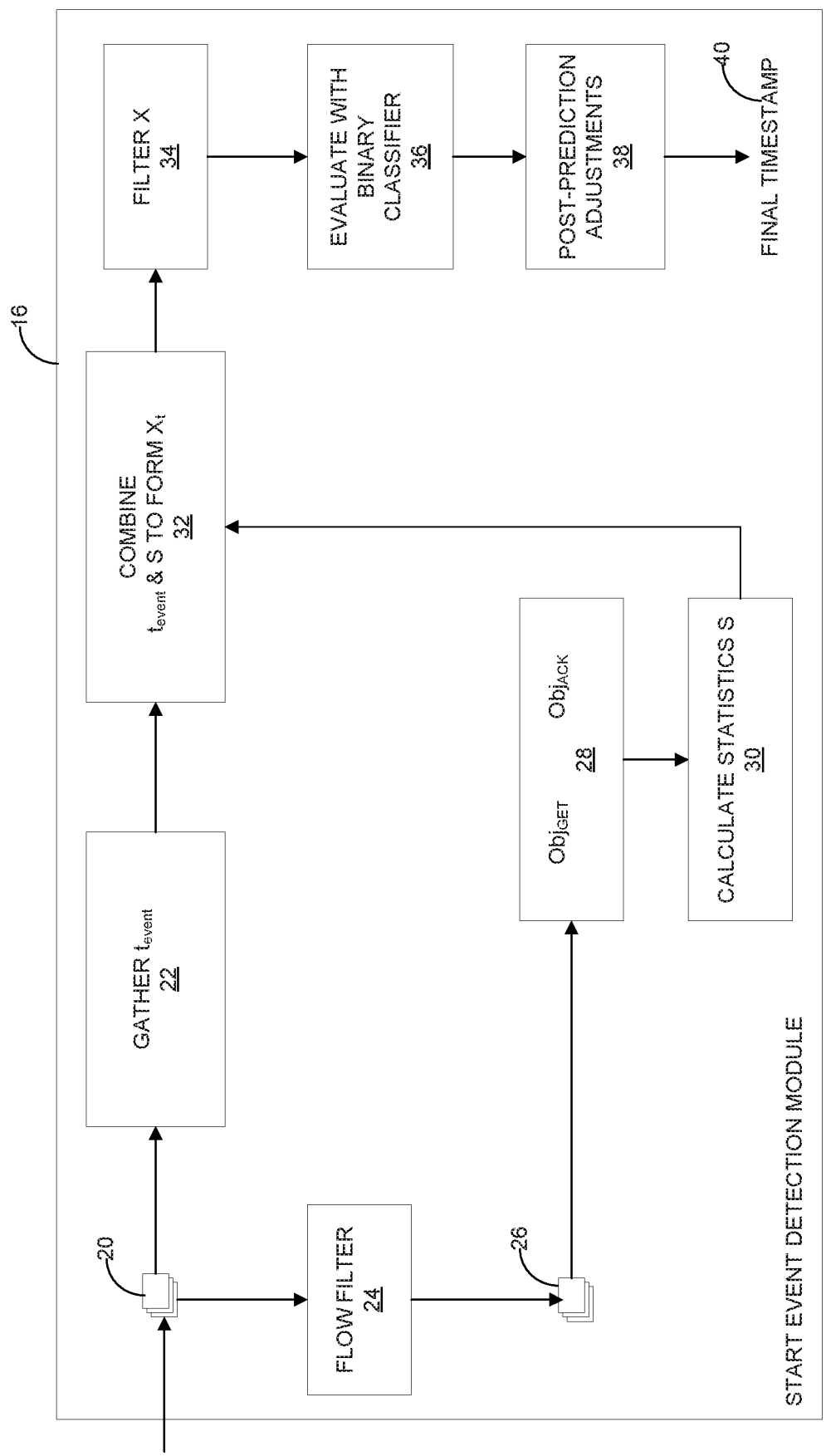
FIG. 2 is a functional block diagram illustrating the analysis of the captured network traces performed by the start event detection module in more detail according to one embodiment of the present disclosure.

FIG. 2 is a functional block diagram illustrating the analysis of the captured network traces performed by the start event detection module 16 in more detail. The following definitions are used to describe the details of that analysis.

- t: a time range during which data packets are observed by the monitoring device 14.
- $t_d$: the duration of time range.
- $t_\Delta$: the time frame offset between two subsequent time ranges $t_1$ and $t_2$. As an example, for $t_d$=20 seconds and $t_\Delta$=10 seconds, descriptive statistics are calculated every 10 seconds for packets observed in the next 20 seconds. By default, $t_\Delta = t_d$.
- $t_{event}$: this is an event that indicates an upcoming (i.e. DNS query) or ongoing (e.g. TCP SYN) flow open action towards the domain of the content provider.
- Obj: the assumed objective of the data packets observed by the monitoring device 14. This gives a subset of data packets. Different objectives are defined by relevant transport layer or application layer events (e.g., ACK frames in the transport layer, HTTP GET requests for video/audio segments in the application layer, and the like), and are estimated based on one or more of packet header content, packet size, direction, and frequency.
- $X_t$: a single observation for a model prediction. It contains indicator variables of $t_{event}$ and descriptive statistics calculated for packet objectives Obj occurring in t.
- $f(X_t,\alpha)$: this is a binary classifier configured to return a START/NO START result for an observation $X_t$.

As seen in FIG. 2, the start event detection module 16 evaluates a single observation $X_t$ in t, where t is the time range during which data packets are observed by the monitoring device 14, and is uniquely identified by a timestamp indicating the start of the monitoring period. Packets observed in this period are processed according to the following.

Packets of raw data 20, which may include data associated audio/video streams and/or non-audio/video streams, are received from monitoring device 14. The start event detection module then gathers the timestamps of the $t_{event}$ actions from the received data (box 22). These actions indicate flow open events sent to relevant domains. Such domains include, but are not limited to, DNS queries, QUIC Client Hello (CHLO), and TCP handshake (e.g. SYN) messages.

Starting a new video usually requires the opening of new flows. Therefore finding flow open events can be one of the most important clues in detecting a video start event. For example, DNS queries that are sent to known video delivery domains preceding flow open events mark points of high interest in the data packets 20. Such information may indicate the start of a video event. However, there are other considerations. For example, the probability of two pieces of video content being delivered from the same domain in case of OTT service providers is assumed to be zero. This assumption, however, introduces the possibility of false negative predictions. Particularly, due to non-randomness of user behavior, the same content can be played multiple times.

Another possible source of error is when subsequent videos are served from the same domain. Particularly, in these situations, the assumption above does not hold. However, additional information that can support the detection of video starts is helpful. For example, such information can be connection initiation requests indirectly related to video streaming and includes, but is not limited to, the detection of a large number of new connections established simultaneously to a content provider. This information can help the start event detection module 16 implicitly detect a start event in which the more explicit video streaming flow open events are missing. Additionally, complex classifiers with rich descriptive statistics can also be utilized.

The packets of raw data 20 are also fed into a flow filter (box 24) to identify network flows directly related to audio/video streaming. In one embodiment, for example, such audio/video related flows are determined based on IP addresses, Server Name Indications (SNIs), and DNS queries associated with the data packets 20.

Filtering, however, may also return irrelevant flows, such as those associated with thumbnail image downloads. Therefore, additional filtering may be applied by checking for video streaming patterns in the flows. For example, the flow filter (box 24) may also identify whether a given flow is/is not an audio/video flow based on the amount of data transferred by a flow, the amount of data transferred by a flow during the lifetime of the flow since being established, the duration of the lifetime of the flow since being established, and/or the percentage of total data transferred by a flow in a given time period. Additionally, video streaming requires orders of magnitude more data to be transferred over time compared to other content types of media, such as images or static elements. Therefore, flows associated with video streaming can also be distinguished based on the volume of downloaded bytes for the flow.

The filtered data packets 26 associated with the audio/video flows are then processed to identify the objective Obj of the data packets (box 28). Such objectives Obj may be identified based on, for example, the size of the data packets, the frequency with which the data packets are received, and an address of a source that sent the packets.

In more detail, encrypted packets generally expose a very limited amount and type of information in plain text to an observer. Nevertheless, some information is always available, such as packet size, timestamp information, and direction of travel. According to one advanced approach, the present embodiments utilize this information to estimate the objective of the filtered data packets 26. Estimating the data packet objective enhances the information subsequently provided to a binary classifier (box 36).

For example, HTTP GET requests are, in general, larger uplink packets that occur periodically during a stable phase of content delivery, or in bursts during a buffering phase of content delivery. Therefore, the time difference between two received data packets assumed to be HTTP GET requests can provide important information about the current phase of content delivery—i.e., delivery may be in a stable phase or a burst phase based on the time difference between two data packets. HTTP GET requests may also have varying response sizes that may also indicate a phase of content delivery. For example, a typical client application will initially request data in small portions, indicating a buffering phase of content delivery, and then scale the requested amounts of data up over time, indicating a stable phase of content delivery.

Then, for each objective Obj determined in box 28, the present embodiments generate descriptive statistics $S_{(t,Obj)}$ for packets transmitted in time frame t (box 30). More particularly, in one embodiment, data packets are filtered based on the determined objectives Obj to include only those packets that will have a significant impact on the prediction. The resulting set of packets usually relates to operations associated with retrieving a list of possible representations (i.e., a DASH manifest) and requesting audio and video chunks.

Generally, a video start event is a longer process that can span a few seconds, or in cases of poor network conditions, tens of seconds. Therefore, the time range duration $t_d$ must be defined such that it is large enough to obtain a sufficient amount of information for a definite prediction, but small and precise enough to facilitate the accuracy of other metrics that depend on the outcome of the model. Another reason to keep duration $t_d$ relatively short is to make the possibility of having multiple video start events in one observation unlikely.

Therefore, in one embodiment, the present disclosure determines the time range duration $t_d$ based on a set of metrics closely related to start event patterns (i.e., events that typically emerge during start events), while also being simple enough to be calculated at scale. These metrics include, but are not limited to, a data packet count, a sum of data packet lengths, an average data packet length, a variance in the lengths of the data packets, and/or an elapsed time between two observed packets.

The rigid structure of time frames can also introduce errors. For example, it is more resource-efficient to calculate metrics online than it is to query packets in arbitrary time frames from memory. However, in doing so, it is possible to cut start event patterns in half. One possible solution is to introduce a second set of time frames with an offset of $t_\Delta$. In this case, $X_i$ values will share some information with their neighboring observations $X_{(i-1)}$ and $X_{(i+1)}$. However, if machine learning is implemented, introducing this second set of time frames should be performed in the model training phase because the shared values can cause information to spill over from the training set to the validation set. More particularly, if modeling is applied during a machine learning (i.e., "training") phase, care should be taken to prevent contaminating the validation set with the quasi-duplicate data of the training set. For example, $X_i$ and $X_{(i+1)}$ with small offsets can result in very similar observations. If one observation ends up in the training set, and the other observation ends up in the validation set, then this model may reflect metrics that are misleading, even though it indicates high performance. As such, predictions for the same time frame can result in two levels of confidence. Two positive predictions can be considered confident, while single predictions can be included for maximum recall, dismissed for maximum precision, or re-evaluated.

Next, in box 30, the method calculates descriptive statistics $S_t$ for the packet objectives Obj determined occurring in t (see box 28). The generated metrics $S_t$ are then combined (box 32) with flow open actions $t_{event}$ (i.e., the output of box 22) to form observations $X_t$.

The method of the present embodiment then reduces the number of predictions needed to determine a timestamp for a video start event by filtering (box 34) observations $X_t$ based on $S_t$ or $t_{event}$ values. Particularly, time frames within time range $t_d$ that contain start events are a very small fraction of all observations. However, there may be situations in which Over The Top (OTT) providers need more complex models to achieve adequate results. Therefore, to maintain the accuracy of a prediction without sacrificing performance, the number of observations $X_t$ requiring evaluation can be greatly reduced by dismissing those observations $X_t$ in which the occurrence of a start event is unlikely. This can be accomplished by using simple conditions based on $S_t$ or $t_{event}$ values. For example, observations $X_t$ that do not exceed an uplink or downlink data transfer threshold, or do not have flow open events, can be discarded.

Observation $X_t$ is then evaluated using a binary classifier $f(X_t,\alpha)$ (box 36) to predict a START or NO START outcome for the data packets monitored during time range t. More particularly, in this stage of processing, the calculated metrics $S_t$ and relevant events are combined. A trained binary classifier is used to determine if a video start event happened in time range t. In one embodiment, the binary classifier used to determine whether a video start event occurred during time range t is selected from a plurality of binary classifier functions. Which particular binary classifier is selected depends on the behavior of OTT providers. Complex patterns of actions in the received data packets may require more advanced models, otherwise faster methods requiring minimal input are preferred.

In at least one embodiment, the selected binary classifier was trained using information in a labeled dataset. Specifically, the labeled dataset comprises information from network traces in which both the network and the state of the user device is monitored by monitoring device 14. The data traces yielded by monitoring the user device particularly facilitates matching a binary START-NO START label y with $X_t$. Using this labeled dataset, a binary classifier (e.g. CART) can be trained.

According to the present embodiments, the labeled dataset is generated so that it represents scenarios that occur in production settings. This requires careful planning. Moreover, the process used to calculate observation $X_t$ must be the same as the process used during training. Thus, according to the present embodiments, a classifier is selected based on the performance achieved using a labeled dataset that is different than the one it was trained on.

Next, embodiments of the present disclosure perform post-prediction adjustments (box 38) and output a final timestamp 40. Actual video start events can occur in the network much earlier than the content is shown. This behavior is designed to make rendering subsequent portions of the requested content seamless, and effectively eliminates the initial buffering phase by utilizing a "draining phase" of the current session. The present embodiments are therefore configured to recognize premature buffering and report it for that timestamp.

In particular, if such behavior is encountered, the detected final timestamp 40 is offset to the timestamp that indicates when the traffic becomes active again to that domain. The estimated duration of the pre-loaded buffer is then subtracted to yield an adjusted final timestamp 40.

Additional processing can pinpoint the exact moment of the video start event. For example, the $t_{event}$ of a flow open action provides reference point for determining the first packet that arrived in the established flow. So known, the final timestamp 40 can be determined based on the timestamp of that first arrived packet.

Figure 3:
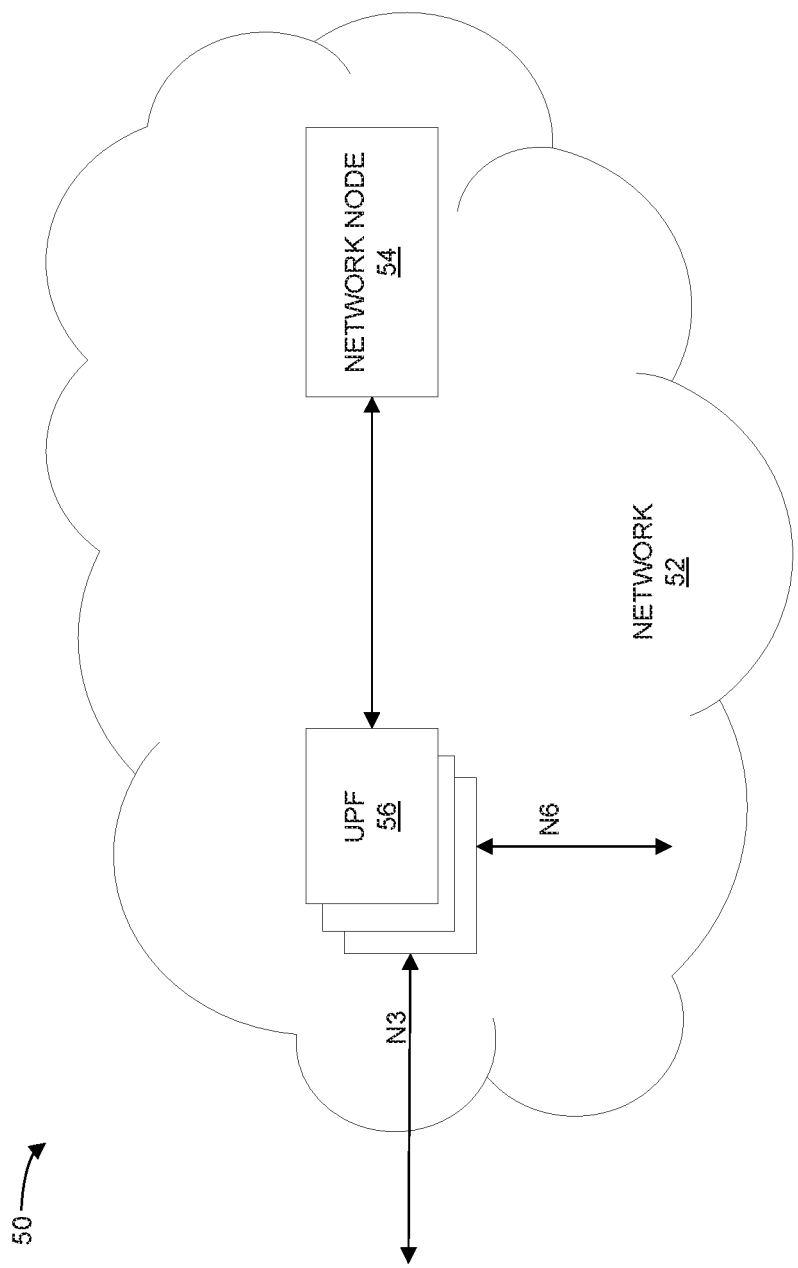
FIG. 3 is a functional block diagram of a system configured according to one embodiment of the present disclosure.

FIG. 3 is a functional block diagram of a system 50 configured according to one embodiment of the present disclosure. As seen in FIG. 3, a network 52 facilitates communication of data and information between a network node 54 and one or more User Plane Functions 56.

The functions of system 50 can be split into two functions: feature extraction and Key Performance Indicator (KPI) calculation. The feature extraction processing, which may occur at the UPF 56, receives all video related traffic of a given subscriber (by tapping or mirroring the subscriber's traffic) via an N6 interface, and processes these packets one by one in order to extract one or more features for further KPI calculation. Such features include, but are not limited to, the number of downloaded bytes in a given time window, the number of logged DNS requests in the system, and the like. In one embodiment, the functionality described above with respect to blocks 22, 24, 28, and 30 are part of the feature extraction processing.

Regarding KPI calculation, the processed and extracted features monitored over multiple minutes, or of multiple subscribers, can be bundled together and forwarded to a network node 54 in a cloud environment using a common interface (e.g. REST API). In some cases, the data can be distributed among a plurality of worker nodes. Meanwhile complex analyses and KPI prediction can be implemented by a separate function executed by one or more network nodes 54. In one embodiment, the functionality described above with respect to boxes 34, 36, and 38 are performed by the network node 54.

One benefit of an architecture such as shown in FIG. 3 is that it can be extended with additional logic in order to monitor only a subgroup of subscribers. Parameters such as a number of subscribers or a list of the subscribers of this monitored group can be dynamically changed using, for example, smart filtering logic situated in the cloud. This logic could also dynamically modify the parameters based on a current performance, or it can focus on a set of problematic areas or subscribers for detailed analyses.

Thus, the proper identification of video start events is an overlooked, yet key issue, for session-based QoE estimation. The present disclosure, however, addresses this issue and provides the first comprehensive solution that is universally applicable to a wide range of content providers. The embodiments described herein consider different aspects including, but not limited to, the effects of network conditions, user interactions, client applications, and the underlying transport protocols, in order to provide a computationally feasible and accurate solution for detecting a start event.

As such, embodiments of the present disclosure provide benefits and advantages that conventional techniques do not provide. In particular, the present embodiments consider:

The various characteristics of different OTT providers;
Differences between transport layer protocols (e.g. TCP and QUIC);
Differences between platforms and client players, such as native applications compared to browsers, and the effect of different devices;
Network conditions, such as reduced bandwidth and packet loss;
The effects of user interactions with the video stream, such as early abandonment, seek, pause, and resolution change; and
The impact of video advertisements.

The present embodiments also collect a feature-rich dataset that enables the techniques described herein to provide a good balance between resilience to noise, prediction accuracy, and runtime performance. Additionally, the present embodiments can introduce various controlled variables, which helps to gain model evaluation results that are comparable to real-world datasets. Further, the extensive process of data collection according to the present embodiments makes it possible to explore and validate start event indicator candidates. Aside from satisfactory prediction accuracy (bias) and generalization error (variance), the techniques provided by the present embodiments offer a reasonable runtime. This is critical, because in production environments, immense amount of traces need to be processed and evaluated. The embodiments described herein, however, are optimized so that they can satisfy each of these requirements.

Figure 4:
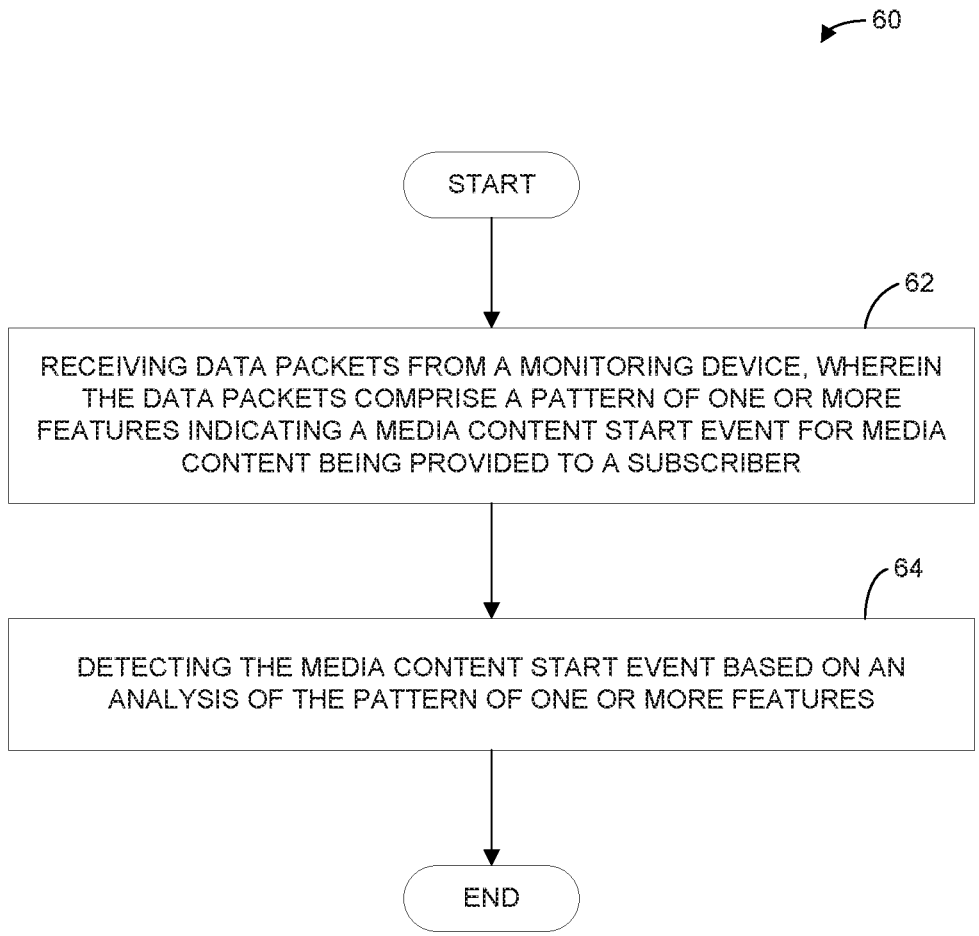
FIG. 4 is a flow diagram illustrating a method for determining a video start event according to one embodiment of the present disclosure.

FIG. 4 is a flow diagram illustrating a method for determining a video start event according to one embodiment of the present disclosure. In this embodiment, method 60 is implemented by network node 54.

As seen in FIG. 4, method 60 begins with the network node 54 receiving data packets from monitoring device 14. The data packets comprise a pattern of one or more features indicating a media content start event, such as a video start event, for example, for media content being provided to a subscriber (box 62). So received, the media content start event is detected based on an analysis of the pattern of one or more features.

In one embodiment, detecting the media content start event comprises detecting a timestamp for each of one or more flow open events to one or more domains.

In one embodiment, at least one of the flow open events comprises a Domain Name System (DNS) query received by a domain configured to provide the media content.

In one embodiment, at least one of the flow open events comprises a QUIC Client Hello (CHLO) message received by a domain configured to provide the media content.

In one embodiment, at least one of the flow open events comprises a Transmission Control Protocol (TCP) handshake message received by a domain configured to provide the media content.

In one embodiment, the TCP handshake message comprises one of a synchronize (SYN) message received by the domain configured to provide the media content, and a SYN-ACK message sent by the domain configured to provide the media content.

In one embodiment, detecting the media content start event comprises detecting a timestamp for each of a plurality of new connection request messages received by a media content provider.

In one embodiment, detecting the media content start event comprises determining one or more complex classifiers.

In one embodiment, detecting the media content start event comprises identifying one or more network flows associated with providing the media content to the subscriber.

In one embodiment, identifying one or more network flows associated with providing the media content to the subscriber comprises filtering out a network flow that is not associated with providing the media content to the subscriber.

In one embodiment, a network flow associated with providing the media content to the subscriber is identified based on a duration of a lifetime of the flow since being established.

In one embodiment, a network flow associated with providing the media content to the subscriber is identified based on an amount of data being transferred by the network flow.

In one embodiment, a network flow associated with providing the media content to the subscriber is identified based on a total amount of data transferred by the network flow since being established.

In one embodiment, a network flow associated with providing the media content to the subscriber is identified based on a percentage of total data transferred by the network flow during a given time period.

In one embodiment, a network flow associated with providing the media content to the subscriber is identified based on a volume of downloaded data.

In one embodiment, detecting the media content start event further comprises determining one or more objectives of the data packets.

In one embodiment, an objective of the data packets is determined based on a size of the data packets.

In one embodiment, an objective of the data packets is determined based on a data packet timestamp included in a data packet.

In one embodiment, an objective of the data packets is determined based on a direction of the data packet.

In one embodiment, an objective of the data packets is determined based on a time difference between two of the data packets.

In one embodiment, the method further comprises generating, for each objective, metrics $S_t$ for the data packets transmitted in a predetermined time frame t.

In one embodiment, generating the statistics comprises filtering the data packets to include only the data packets expected to impact the detection of the media content start event.

In one embodiment, the data packets expected to impact the detection of the media content start event comprise data packets associated with one or both of retrieving a file identifying one or more possible addresses for providing the media content and requesting portions of the media content.

In one embodiment, the generated metrics $S_t$ comprise one or more of a count of the data packets transmitted in the predetermined time frame t, a sum of the lengths of the data packets transmitted in the predetermined time frame t, an average length of the data packets transmitted in the predetermined time frame t, a variance in the length of the data packets transmitted in the predetermined time frame t, and an elapsed time between first and second data packets transmitted in the predetermined time frame t.

In one embodiment, the predetermined time frame t has a time duration $t_d$.

In one embodiment, the predetermined time frame t has a time duration $t_d$ plus a time offset $t_\Delta$.

In one embodiment, a first predetermined time frame t overlaps at least one of a previous time frame t−1 and a next time frame t+1.

In one embodiment, the method further comprises filtering the one or more features based on the generated metrics $S_t$.

In one embodiment, the method further comprises filtering the one or more features based on a time of one or more events $t_{event}$ associated with the media content.

In one embodiment, filtering the one or more features comprises discarding the data packets that do not have features indicating a flow open event.

In one embodiment, filtering the one or more features comprises discarding data packets transmitted at a rate that does not exceed a predetermined uplink or downlink transfer rate threshold.

In one embodiment, detecting the media content start event comprises combining the generated metrics $S_t$ with one or more flow open events to form an observation $X_t$, and predicting a START event or a NO START event for the observation $X_t$.

In one embodiment, the START event or NO START event for the observation $X_t$ is predicted using a binary classifier function $f(X_t,\alpha)$, wherein $\alpha$ is a set of parameters for a classifier.

In one embodiment, the START event indicates the media content start event.

In one embodiment, the method further comprises re-setting a timestamp of the media content start event based on detecting that a draining phase of a current media session is being used as an initial buffering phase for a new media session.

In one embodiment, re-setting a timestamp of the media content start event further comprises re-setting the timestamp to a timestamp of a first data packet received in connection with a network flow.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
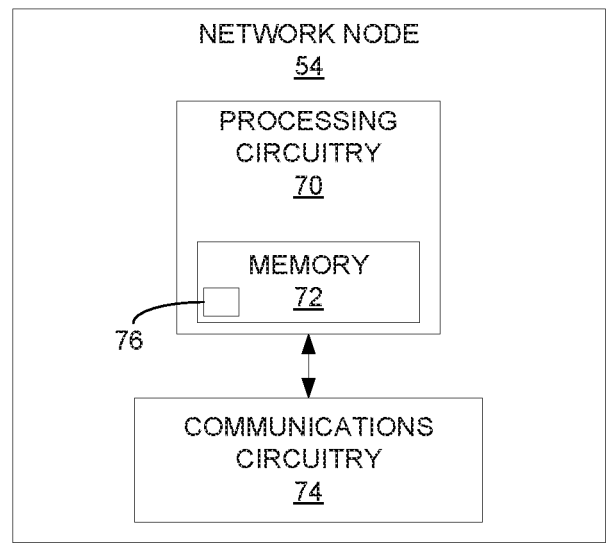
FIG. 5 is a block diagram illustrating some components of a network node configured according to one embodiment of the present disclosure.

FIG. 5 is a block diagram illustrating some components of a network node 54 configured according to one embodiment of the present disclosure. The network node 54 comprises processing circuitry 70, memory circuitry 72, and communications circuitry 76. In addition, memory circuitry 72 stores a computer program 74 that, when executed by processing circuitry 70, configures network node 54 to implement the methods herein described.

In more detail, the processing circuitry 70 controls the overall operation of network node 54 and processes the data and information it receives from other sends and receives to/from other nodes. Such processing includes, but is not limited to, a method for detecting media content start events by receiving data packets from a monitoring device. The data packets comprise a pattern of one or more features indicating a media content start event for media content being provided to a subscriber, and detecting the media content start event based on an analysis of the pattern of one or more features. In this regard, the processing circuitry 70 may comprise one or more microprocessors, hardware, firmware, or a combination thereof.

The memory circuitry 72 comprises both volatile and non-volatile memory for storing computer program code and data needed by the processing circuitry 70 for operation. Memory circuitry 72 may comprise any tangible, non-transitory computer-readable storage medium for storing data including electronic, magnetic, optical, electromagnetic, or semiconductor data storage. As stated above, memory circuitry 72 stores a computer program 74 comprising executable instructions that configure the processing circuitry 70 to implement the methods herein described. A computer program 74 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 74 for configuring the processing circuitry 70 as herein described may be stored in a removable memory, such as a portable compact disc, portable digital video disc, or other removable media. The computer program 74 may also be embodied in a carrier such as an electronic signal, optical signal, radio signal, or computer readable storage medium.

The communication circuitry 76 communicatively connects network node 54 to one or more other nodes via a communications network, as is known in the art. In some embodiments, for example, communication circuitry 76 communicatively connects network node 54 to a plurality of other network nodes in system 10. As such, communications circuitry 76 may comprise, for example, an ETHERNET card or other circuitry configured to communicate wirelessly with the other network nodes.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 6:
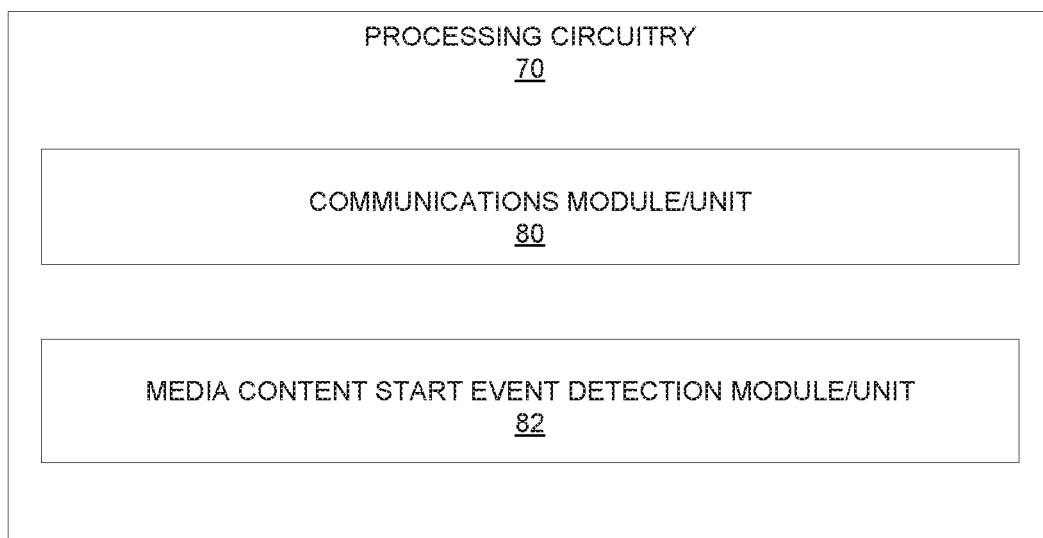
FIG. 6 is a functional block diagram illustrating some functions of computer program executed by a network node configured according to one embodiment of the present disclosure.

FIG. 6 is a functional block diagram illustrating some functions of computer program 74 executed by processing circuitry 72 of network node 70 according to one embodiment of the present disclosure. As seen in FIG. 6, computer program 74 comprises a communications module/unit 80 and a media content start event detection module/unit 82.

When computer program 74 is executed by processing circuitry 70, the communications module/unit 80 configures network node 90 to receive data packets 20 from monitoring device 14, as previously described. The data packets 20, as previously described, comprise a pattern of one or more features indicating a media content start event for media content (e.g., a video stream) being provided to a subscriber. Additionally, the media content start event detection module/unit 82 configures network node 90 to detect the media content start event based on an analysis of the pattern of one or more features, as previously described.

Embodiments further include a carrier containing such a computer program 96. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium. The present embodiments provide benefits and advantages that conventional systems and method do not provide. For example:

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for detecting media content start events, the method implemented at a network node communicatively connected to a monitoring device and comprising:
   receiving, at the network node, data packets from the monitoring device, wherein the data packets comprise a pattern of one or more features indicating a media content start event for media content being provided to a subscriber;
   analyzing, at the network node, the pattern of one or more features, wherein the analyzing comprises filtering the data packets received from the monitoring device by:
      filtering the data packets received from the monitoring device to estimate an objective for the data packets;
      filtering the filtered data packets based on the objective to include only the data packets received from the monitoring device that are expected to impact the detection of the media content start event; and
      generating, for the objective, metrics St for the data packets transmitted in a predetermined time frame t, wherein generating the metrics $S_t$ comprises the filtering of the filtered data packets based on the objective to include only the data packets expected to impact the detection of the media content start event, and wherein the data packets expected to impact the detection of the media content start event comprise data packets associated with one or both of:

retrieving a file identifying one or more possible addresses for providing the media content; and
requesting portions of the media content;
wherein the predetermined time frame t has a time duration $t_d$ plus a time offset $t\alpha$ between two subsequent time ranges $t_1$ and $t_2$, and wherein a first predetermined time frame t overlaps at least one of a previous time frame t−1 and a next time frame t+1 such that the first predetermined time frame t and the at least one of the previous time frame t−1 and the next time frame t+1 share a common value; and
detecting, at the network node, the mediacontent start event based on the analysis of the pattern of one or more features.

2. The method of claim 1 wherein at least one flow open event comprises a Domain Name System (DNS) query received by a domain configured to provide the media content.

3. The method of claim 1:
wherein detecting the media content start event comprises detecting a timestamp for each of one or more flow open events to one or more domains; and
wherein at least one of the flow open events comprises a QUIC Client Hello (CHLO) message received by a domain configured to provide the media content.

4. The method of claim 1:
wherein detecting the media content start event comprises detecting a timestamp for each of one or more flow open events to one or more domains;
wherein at least one of the flow open events comprises a Transmission Control Protocol (TCP) handshake message received by a domain configured to provide the media content; and
wherein the TCP handshake message comprises one of a synchronize (SYN) message received by the domain configured to provide the media content, and a SYN-ACK message sent by the domain configured to provide the media content.

5. The method of claim 1 wherein detecting the media content start event comprises at least one of:
detecting a timestamp for each of a plurality of new connection request messages received by a media content provider;
determining one or more complex classifiers; and
identifying one or more network flows associated with providing the media content to the subscriber, wherein identifying one or more network flows associated with providing the media content to the subscriber comprises filtering out a network flow that is not associated with providing the media content to the subscriber.

6. The method of claim 5 wherein a network flow associated with providing the media content to the subscriber is identified based on at least one of:
a duration of a lifetime of the flow since being established;
an amount of data being transferred by the network flow;
a total amount of data transferred by the network flow since being established;
a percentage of total data transferred by the network flow during a given time period; and
a volume of downloaded data.

7. The method of claim 1 wherein the objective of the data packets is determined based on at least one of:
a size of the data packets;
a data packet timestamp included in a data packet;
a direction of the data packet; and
a time difference between two of the data packets.

8. The method of claim 1 wherein the generated metrics $S_t$ comprise one or more of:
a count of the data packets transmitted in the predetermined time frame t;
a sum of the lengths of the data packets transmitted in the predetermined time frame t;
an average length of the data packets transmitted in the predetermined time frame t;
a variance in the length of the data packets transmitted in the predetermined time frame t; and
an elapsed time between first and second data packets transmitted in the predetermined time frame t.

9. The method of claim 1 further comprising filtering the pattern of one or more features based on one of:
the generated metrics $S_t$; and
a time of one or more events $t_{event}$ associated with the media content.

10. The method of claim 1 further comprising discarding the data packets that do not have features indicating a flow open event.

11. The method of claim 10 further comprising discarding the data packets transmitted at a rate that does not exceed a predetermined uplink or downlink transfer rate threshold.

12. The method of claim 1 wherein detecting the media content start event comprises:
combining the generated metrics $S_t$ with one or more flow open events to form an observation $X_t$; and
predicting a START event or a NO START event for the observation $X_t$.

13. The method of claim 12 wherein the START event or the NO START event for the observation Xt is predicted using a binary classifier function $f(X_t, \alpha)$, wherein $\alpha$ is a set of parameters for a classifier.

14. The method of claim 12 wherein the START event indicates the media content start event.

15. The method of claim 1 further comprising re-setting a timestamp of the media content start event based on detecting that a draining phase of a current media session is being used as an initial buffering phase for a new media session.

16. The method of claim 15 wherein re-setting a timestamp of the media content start event further comprises re-setting the timestamp to a timestamp of a first data packet received in connection with a network flow.

17. A network node for detecting media content start events, the network node comprising:
communications interface circuitry configured to communicate with at least one monitoring device configured to monitor media session traffic in a communications network; and processing circuitry operatively coupled to the communications interface circuitry and configured to:
receive data packets from the monitoring device, wherein the data packets comprise a pattern of one or more features indicating a media content start event for media content being provided to a subscriber;
analyze the pattern of one or more features, wherein to analyze the pattern of one or more features, the processing circuitry is configured to filter the data packets received from the monitoring device by:
filtering the data packets received from the monitoring device to estimate an objective for the data packets; and
filtering the filtered data packets based on the objective to include only the data packets received from the monitoring device that are expected to impact the detection of the media content start event; and generating, for the objective, metrics St for the data packets transmitted in a predetermined time frame t, wherein generating the metrics $S_t$ comprises the filtering of the filtered data packets based on the objective to include only the data packets expected to impact the detection of the media content start event, and wherein the data packets expected to impact the detection of the media content start event comprise data packets associated with one or both of:
    retrieving a file identifying one or more possible addresses for providing the media content; and
    requesting portions of the media content;
wherein the predetermined time frame t has a time duration $t_d$ plus a time offset tα between two subsequent time ranges $t_1$ and $t_2$, and wherein a first predetermined time frame t overlaps at least one of a previous time frame t−1 and a next time frame t+1 such that the first predetermined time frame t and the at least one of the previous time frame t−1 and the next time frame t+1 share a common value; and
detecting, at the network node, the media content start event based on the analysis of the pattern of one or more features.

18. A non-transitory computer-readable medium storing computer program code thereon that, when executed by processing circuitry of a network node configured to detect media content start events, causes the network node to:
    receive data packets from the monitoring device, wherein the data packets comprise a pattern of one or more features indicating amedia content start event for media content being provided to a subscriber;
    analyze the pattern of one or more features, wherein to analyze the pattern of one or more features, the processing circuitry is configured to filter the data packets received from the monitoring device by:
        filtering the data packets received from the monitoring device to estimate an objective for the data packets; and
        filtering the filtered data packets based on the objective to include only the data packets received from the monitoring device that are expected to impact the detection of the media content start event; and
    generating, for the objective, metrics St for the data packets transmitted in a predetermined time frame t, wherein generating the metrics $S_t$ comprises the filtering of the filtered data packets based on the objective to include only the data packets expected to impact the detection of the media content start event, and wherein the data packets expected to impact the detection of the media content start event comprise data packets associated with one or both of:
        retrieving a file identifying one or more possible addresses for providing the media content; and
        requesting portions of the media content;
    wherein the predetermined time frame t has a time duration $t_d$ plus a time offset tα between two subsequent time ranges $t_1$ and $t_2$, and wherein a first predetermined time frame t overlaps at least one of a previous time frame t−1 and a next time frame t+1 such that the first predetermined time frame t and the at least one of the previous time frame t−1 and the next time frame t+1 share a common value; and
detecting, at the network node, the media content start event based on the analysis of the pattern of one or more features.

\* \* \* \* \*